United States Patent
Zemany et al.

(10) Patent No.: US 11,601,214 B2
(45) Date of Patent: Mar. 7, 2023

(54) SYSTEM AND METHOD FOR NULLING OR SUPPRESSING INTERFERING SIGNALS IN DYNAMIC CONDITIONS

(71) Applicant: BAE SYSTEMS INFORMATION AND ELECTRONIC SYSTEMS INTEGRATION INC., Nashua, NH (US)

(72) Inventors: Paul D. Zemany, Amherst, NH (US); Matthew F. Chrobak, Groton, MA (US); Egor V. Degtiarev, Merrimack, NH (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 1050 days.

(21) Appl. No.: 16/253,283

(22) Filed: Jan. 22, 2019

(65) Prior Publication Data
US 2020/0235843 A1 Jul. 23, 2020

(51) Int. Cl.
*G01S 19/21* (2010.01)
*H04K 3/00* (2006.01)
(Continued)

(52) U.S. Cl.
CPC ............ *H04K 3/224* (2013.01); *G01S 19/21* (2013.01); *H01Q 3/2611* (2013.01); *H04K 3/90* (2013.01);
(Continued)

(58) Field of Classification Search
CPC ...... H04K 3/224; H04K 3/90; H04K 2203/24; H04K 2203/32; G01S 19/21; G01S 19/49;
(Continued)

(56) References Cited

U.S. PATENT DOCUMENTS 6,366,239 B1 * 4/2002 Miller .................. H01Q 3/2611
342/372
6,388,610 B1 5/2002 Przyjemski et al.
(Continued)

OTHER PUBLICATIONS

M. Barrett and R. Arnott, "Adaptive antennas for mobile communications," IEEE Electronics and Communication Engineering Journal, vol. 6, No. 4, pp. 203-214, 1994.
(Continued)

*Primary Examiner* — Timothy A Brainard
(74) *Attorney, Agent, or Firm* — Sand, Sebolt & Wernow LPA; Gary McFaline

(57) ABSTRACT

A system and method for nulling or suppressing interfering signals directed toward moving platforms based, at least in part, on dynamic motion data of the moveable platform is provided. The system may be an interference nulling system carried by a moveable platform and may include an antenna array including two or more antenna elements that generates at least one initial steerable null radiation pattern, dynamic motion data logic that determines dynamic motion data of the moveable platform; and update logic that updates the at least one initial steerable null radiation pattern based, at least in part, on the dynamic motion data. The at least one updated steerable null radiation pattern is directed toward a direction from which interfering signals are being transmitted from an interfering signal source.

16 Claims, 9 Drawing Sheets

(51) Int. Cl.
*H01Q 3/26* (2006.01)
*F41G 7/34* (2006.01)

(52) U.S. Cl.
CPC .......... *F41G 7/346* (2013.01); *H04K 2203/24* (2013.01); *H04K 2203/32* (2013.01)

(58) Field of Classification Search
CPC .... H01Q 3/2611; H01Q 21/20; H01Q 3/2617; H01Q 9/0407; F41G 7/346
See application file for complete search history.

(56) References Cited

U.S. PATENT DOCUMENTS

| | | | |
|---|---|---|---|
| 7,249,730 B1 | 7/2007 | Flippen, Jr. | |
| 8,552,349 B1* | 10/2013 | Alexander | F41G 7/346 701/470 |
| 11,230,375 B1* | 1/2022 | Hoffberg | B64C 21/00 |
| 2012/0264388 A1* | 10/2012 | Guo | H04B 17/345 455/307 |
| 2015/0039220 A1 | 2/2015 | Georgy et al. | |
| 2016/0349375 A1 | 12/2016 | Littlefield et al. | |
| 2016/0373173 A1* | 12/2016 | Koifman | H04L 5/0044 |
| 2017/0170556 A1* | 6/2017 | Carey | H01Q 3/2611 |
| 2017/0244172 A1* | 8/2017 | Hyde | H01Q 13/20 |
| 2019/0182680 A1* | 6/2019 | Vannucci | H01Q 3/40 |

OTHER PUBLICATIONS

M. Souden, J. Benesty, and S. Affes, "A study of the LCMV and MVDR noise reduction filters," IEEE Transactions on Signal Processing, vol. 58, No. 9, pp. 4925-4935, 2010.

K. M. Buckley and L. J. Griffiths, "Spatial filtering with broadband minimum variance beamformers," IEEE Antennas and Propagation Society International Symposium, vol. 34, No. 5, pp. 1322-1323, 1986.

D. Z. Filho, CH. C. Cavalcante, and J. M. T. Romano, "Adaptive LCMV beamforming avoiding DOA estimation for packet-like wireless systems," in Proceedings of the International Telecommunications Symposium, 2002.

T. S. Kiong, M. Ismail, and A. Hassan, "WCDMA forward link capacity improvement by using adaptive antenna with genetic algorithm assisted MDPC beamforming technique," Journal of Applied Sciences, vol. 6, No. 8, pp. 1766-1773, 2006.

Z. Xu, H. Li, Q.-Z. Liu, and J.-Y. Li, "Pattern synthesis of conformal antenna array by the hybrid genetic algorithm," Progress in Electromagnetics Research, vol. 79, pp. 75-90, 2008.

O. Kaid Omar, F. Debbat, and A. Boudghene Stambouli, "Null steering beamforming using hybrid algorithm based on honey bees mating optimization and tabu search in adaptive antenna array," Progress in Electromagnetics Research C, vol. 32, pp. 65-80, 2012.

K. Guney and M. Onay, "Amplitude-only pattern nulling of linear antenna arrays with the use of bees algorithm," Progress in Electromagnetics Research, vol. 70, pp. 21-36, 2007.

S. W. Yang, Y. B. Gan, and A. Y. Qing, "Antenna-array pattern nulling using a differential evolution algorithm," International Journal of RF and Microwave Computer-Aided Engineering, vol. 14, No. 1, pp. 57-63, 2004.

Z. D. Zaharis and T. V. Yioultsis, "A novel adaptive beamforming technique applied on linear antenna arrays using adaptive mutated Boolean PSO," Progress in Electromagnetics Research, vol. 117, pp. 165-179, 2011.

M. M. Khodier and C. G. Christodoulou, "Linear array geometry synthesis with minimum sidelobe level and null control using particle swarm optimization," IEEE Transactions on Antennas and Propagation, vol. 53, No. 8, pp. 2674-2679, 2005.

N. Karaboga, K. Güney, and A. Akdagli, "Null steering of linear antenna arrays with use of modified touring ant colony optimization algorithm," International Journal of RF and Microwave Computer-Aided Engineering, vol. 12, No. 4, pp. 375-383, 2002.

D. Karaboga, K. Guney, and A. Akdagli, "Antenna array pattern nulling by controlling both amplitude and phase using modified touring ant colony optimization algorithm," International Journal of Electronics, vol. 91, No. 4, pp. 241-251, 2004.

A. A. Akdagli, K. Guney, and D. Karaboga, "Touring ant colony optimization algorithm for shaped-beam pattern synthesis of linear antenna," Electromagnetics Research, vol. 26, No. 8, pp. 615-628, 2006.

K. Guney and A. Akdagli, "Null steering of linear antenna arrays using modified tabu search algorithm," Progress in Electromagnetics Research, vol. 33, pp. 167-182, 2001.

S. K. Tiong, B. Salem, S. P. Koh, K. P. Sankar, and S. Darzi, "Minimum variance distortionless response (MVDR) beamformer with enhanced nulling level control via dynamic mutated artificial immune system," The Scientific World Journal, vol. 2014, Article ID 164053, 9 pages, 2014.

B. Babayigit, A. Akdagli, and K. Guney, "A clonal selection algorithm for null synthesizing of linear antenna arrays by amplitude control," Journal of Electromagnetic Waves and Applications, vol. 20, No. 8, pp. 1007-1020, 2006.

B. Salem, S. K. Tiong, and S. P. Koh, "Beamforming algorithms technique by using MVDR and LCMV," World Applied Programming, vol. 2, No. 5, pp. 315-324, 2012.

G. Renzhou, "Suppressing radio frequency interferences with adaptive beamformer based on weight iterative algorithm," in Proceedings of the IET Conference on Wireless, Mobile and Sensor Networks (CCWMSN '07), pp. 648-651, 2009.

A. Ali, R. L. Ali, and A. Rehman, "An improved gain vector to enhance convergence characteristics of recursive least squares algorithm," International Journal of Hybrid Information Technology, vol. 4, pp. 99-107, 2011.

J. Kennedy and R. Eberhart, "Particle swarm optimization," in Proceedings of the IEEE International Conference on Neural Networks, pp. 1942-1948, Dec. 1995.

H. Wang, H. Sun, C. Li, S. Rahnamayan, and J. Pan, "Diversity enhanced particle swarm optimization with neighborhood search," Information Sciences, vol. 223, pp. 119-135, 2013.

G. He and N. Huang, "A modified particle swarm optimization algorithm with applications," Applied Mathematics and Computation, vol. 219, No. 3, pp. 1053-1060, 2012.

C. A. Coello Coell and N. Curz Cortes, "An approach to solve multi objective optimization problem based on artificial immune system," in Proceedings of the 1st International Conference on Artifical Immune Systems (ICARIS 02), pp. 212-221, University of Kent at Canterbury, Canterbury, UK, 2002.

C. A. C. Coello and N. C. Cortés, "Solving multiobjective optimization problems using an artificial immune system," Genetic Programming and Evolvable Machines, vol. 6, No. 2, pp. 163-190, 2005.

E. Rashedi, H. Nezamabadi-Pour, and S. Saryazdi, "GSA: a gravitational search algorithm," Information Sciences, vol. 179, No. 13, pp. 2232-2248, 2009.

G. Binjie and P. Feng, "Modified gravitational search algorithm with particle memory ability and its application," International Journal of Innovative Computing, vol. 9, No. 11, pp. 4531-4544, 2013.

E. Rashedi, H. Nezamabadi-Pour, and S. Saryazdi, "BGSA: binary gravitational search algorithm," Natural Computing, vol. 9, No. 3, pp. 727-745, 2010.

M. Khajehzadeh, M. R. Taha, and M. Eslami, "Efficient gravitational search algorithm for optimum design of retaining walls," Structural Engineering and Mechanics, vol. 45, No. 1, pp. 111-127, 2013.

M. Khajehzadeh, M. R. Taha, A. El-Shafie, and M. Eslami, "A modified gravitational search algorithm for slope stability analysis," Engineering Applications of Artificial Intelligence, vol. 25, No. 8, pp. 1589-1597, 2012.

A. Banks, J. Vincent, and C. Anyakoha, "A review of particle swarm optimization—II. Hybridisation, combinatorial, multicriteria and constrained optimization, and indicative applications," Natural Computing, vol. 7, No. 1, pp. 109-124, 2008.

P. Sun, H. Sun, W. Feng, Q. Zhao, and H. Zhao, "A study of acceleration coefficients in particle swarm optimization algorithm

(56) References Cited

OTHER PUBLICATIONS based on CPSO," in Proceedings of the 2nd International Conference on Information Engineering and Computer Science (ICIECS '10), pp. 1-4, 2010.
International Search Report, PCT/US20/14396, dated Oct. 29, 2020, 17 pages.

* cited by examiner

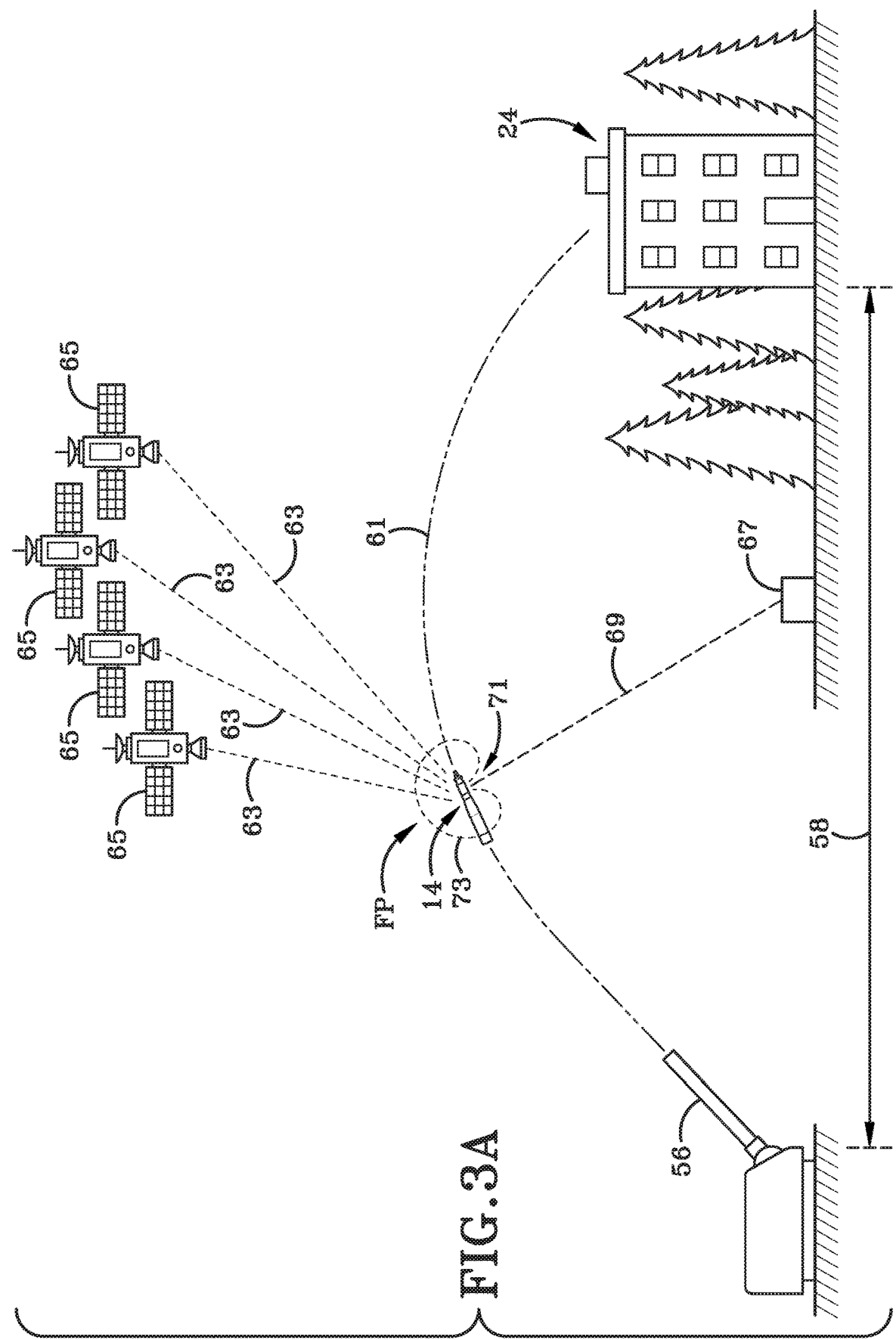

SYSTEM AND METHOD FOR NULLING OR SUPPRESSING INTERFERING SIGNALS IN DYNAMIC CONDITIONS

BACKGROUND

Technical Field

The present disclosure relates generally to nulling or suppressing interfering signals. More particularly, the present disclosure relates to nulling or suppressing interfering signals directed toward moveable platforms. Specifically, the present disclosure relates to nulling or suppressing interfering signals directed toward moveable platforms based, at least in part, on dynamic motion data of the platform.

Background Information

Generally, the Global Positioning System (GPS) is a global navigation satellite system that provides geolocation, time, and range information to a GPS receiver anywhere on or near the Earth where there is an unobstructed line of sight to four or more GPS satellites. Modern tactical systems, such as tactical systems carried by vehicles, typically rely on GPS data for navigation and other purposes. However, a typical concern associated with GPS technology is GPS interference. Typical sources of GPS interference include, but are not limited to, radio frequency (RF) signals in frequency bands proximate to the GPS signals, intentional or unintentional jamming, naturally occurring meteorological conditions, and multipath effects.

One particular type of interference that may affect modern tactical systems is jamming, which may be defined as transmitting signals for the purpose of obstructing reception of GPS signals. As many operations associated with modern tactical systems are dependent upon GPS data, such as, for example, navigation capabilities, jamming may cause deleterious effects.

One conventional method of nulling or suppressing interference is beam forming which is defined as a signal processing technique used in sensor arrays for directional signal transmission or reception. Beamforming is accomplished by combining antenna elements in an antenna array in such a way that signals at particular angles experience constructive interference while others experience destructive interference. For example, a dynamic platform, such as, but not limited to, a guided shell, missile, aircraft, or ship, may utilize two or more antenna elements in an antenna array to null out one or more interfering signal sources, such as one or more GPS jammers. This is accomplished by phase shifting and weighting the antenna outputs and summing the results, so that one or more nulls are placed in the direction of the one or more interfering signal sources. However, since the position and orientation of the dynamic platform changes, the direction of the null, relative to the dynamic platform, changes. This requires changes or updates in the phase shifts and weight values. One conventional method that accounts for the changes in the direction of the null is to readjust the antenna weight coefficients in response to the received level of interfering signals transmitted from the GPS jammer. Since the adjustments are based on a response to the received level of interfering signals transmitted from the GPS jammer, the conventional method may be subject to delays and may have difficulty nulling out the interfering signals due to the rapidly changing dynamics of the platform.

SUMMARY

Issues continue to exist with nulling or suppressing interfering signals directed toward moving platforms. The present disclosure addresses these and other issues by providing a system and method for nulling or suppressing interfering signals directed toward moving platforms based, at least in part, on dynamic motion data of the platform.

In one aspect, an exemplary embodiment of the present disclosure may provide an interference nulling system for a moveable platform, comprising an antenna array including two or more antenna elements that generates at least one initial steerable null radiation pattern; wherein the at least one initial steerable null radiation pattern is directed toward a direction from which interfering signals are being transmitted from at least one interfering signal source; at least one sensor that senses dynamic motion data of the moveable platform; wherein the dynamic motion data includes at least one or more rotational movements of the moveable platform; dynamic motion data logic that processes the dynamic motion data of the moveable platform; and update logic that updates the at least one initial steerable null radiation pattern based, at least in part, on the dynamic motion data; wherein the at least one updated steerable null radiation pattern is directed toward the direction from which the interfering signals are being transmitted from the at least one interfering signal source. The at least one initial steerable null radiation pattern is based, at least in part, on an initial set of weight coefficients of the two or more antenna elements; and wherein the at least one updated steerable null radiation pattern is based, at least in part, on an updated set of weight coefficients of the two or more antenna elements. The dynamic motion data represents at least one of: (i) one or more rotational motions of the moveable platform; and/or (ii) one or more translational motions of the moveable platform.

The interference nulling system may further include logic, processes, instructions, or algorithms, that determine a first set of weight coefficients of the two or more antenna elements; wherein the at least one initial steerable null radiation pattern is based, at least in part, on the first set of weight coefficients.

The interference nulling system may further include first position logic that determines a current position of the moveable platform based, at least in part, on the dynamic motion data; second position logic that determines a predicted position of the moveable platform based, at least in part, on the dynamic motion data; and adaptive weight logic that determines a second set of weight coefficients of the two or more antenna elements based, at least in part, on a change between the current position of the moveable platform and the predicted position of the moveable platform; wherein the at least one updated steerable null radiation pattern is based, at least in part, on the second set of weight coefficients.

The interference nulling system may further include first orientation logic that determines a current orientation of the moveable platform based, at least in part, on the dynamic motion data; second orientation logic that determines a predicted orientation of the moveable platform based, at least in part, on the dynamic motion data; and adaptive weight logic that determines a second set of weight coefficients of the two or more antenna elements based, at least in part, on a change between the current orientation of the moveable platform and the predicted orientation of the moveable platform; wherein the at least one updated steerable null radiation pattern is based, at least in part, on the second set of weight coefficients.

The interference nulling system may further include position and velocity logic that determines a position and velocity of the interfering signal source; tracking logic that tracks movement of the at least one interfering signal source; adaptive weight logic that determines a second set of weight coefficients of the two or more antenna elements based, at least in part, on the movement of the at least one interfering signal source; wherein the at least one updated steerable null radiation pattern is based, at least in part, on the second set of weight coefficients.

In one particular embodiment, the moveable platform may be a precision guidance kit for a guided projectile; wherein the interference nulling system is carried by the precision guidance kit; and wherein the precision guidance kit comprises a canard assembly including at least one canard that is moveable. In one example, the dynamic motion data may represent one or more rotational motions of the precision guidance kit (e.g. coning and other angular motions of the precision guidance kit). In another example, the dynamic motion data may represent one or more translational motions of the precision guidance kit.

In another aspect, an embodiment of the present disclosure may provide a method comprising generating at least one initial steerable null radiation pattern of an array antenna including two or more antenna elements carried by a moveable platform; obtaining dynamic motion data of the moveable platform; wherein the dynamic motion data includes at least one or more rotational movements of the moveable platform; updating the at least one initial steerable null radiation pattern based, at least in part, on the dynamic motion data of the moveable platform; and directing the at least one updated steerable null radiation pattern toward a direction from which interfering signals are being transmitted from an interfering signal source. The at least one initial steerable null radiation pattern is based, at least in part, on an initial set of weight coefficients of the two or more antenna elements; and wherein the at least one updated steerable null radiation pattern is based, at least in part, on an updated set of weight coefficients of the two or more antenna elements. The dynamic motion data represents one of: (i) one or more rotational motions of the moveable platform; and (ii) one or more translational motions of the moveable platform.

The method may further include determining a first set of weight coefficients of the two or more antenna elements; wherein the at least one initial steerable null radiation pattern is based, at least in part, on the first set of weight coefficients.

The method may further include determining a current position of the moveable platform based, at least in part, on the dynamic motion data; determining a predicted position of the moveable platform based, at least in part, on the dynamic motion data; and determining a second set of weight coefficients of the two or more antenna elements based, at least in part, on the current position of the moveable platform and the predicted position of the moveable platform; wherein the at least one updated steerable null radiation pattern is based, at least in part, on the second set of weight coefficients.

The method may further include determining a current orientation of the moveable platform based, at least in part, on the dynamic motion data; determining a predicted orientation of the moveable platform based, at least in part, on the dynamic motion data; and determining a second set of weight coefficients of the two or more antenna elements based, at least in part, on the current position of the moveable platform and the predicted position of the moveable platform; wherein the at least one updated steerable null radiation pattern is based, at least in part, on the second set of weight coefficients.

The method may include determining and updating a position and velocity of the interfering signal source; tracking the movement of the at least one interfering signal source; and determining a second set of weight coefficients of the two or more antenna elements based, at least in part, on the movement of the at least one interfering signal source; wherein the at least one updated steerable null radiation pattern is based, at least in part, on the second set of weight coefficients.

In one particular embodiment, the moveable platform may be a precision guidance kit mounted on a guided projectile; wherein the interference nulling system is carried by the precision guidance kit; and wherein the precision guidance kit comprises a canard assembly including at least one canard that is moveable. In one example, the method may further include rotating the precision guidance kit in one or more rotational motions; wherein the dynamic motion data represents the one or more rotational motions. In another example, the method may further include translating the precision guidance kit in one or more translational motions; wherein the dynamic motion data represents the one or more translational motions.

In another aspect, an embodiment of the present disclosure may provide a system and method for nulling or suppressing interfering signals directed toward moving platforms based, at least in part, on dynamic motion data of the moveable platform. The system may be an interference nulling system carried by a moveable platform and may include an antenna array including two or more antenna elements that generates at least one initial steerable null radiation pattern, dynamic motion data logic that determines dynamic motion data of the moveable platform; and update logic that updates the at least one initial steerable null radiation pattern based, at least in part, on the dynamic motion data. The at least one updated steerable null radiation pattern is directed toward a direction from which interfering signals are being transmitted from an interfering signal source.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 3A is an operational schematic view of the interference nulling system carried by the guided projectile;

Similar numbers refer to similar parts throughout the drawings.

DETAILED DESCRIPTION

Figure 1:
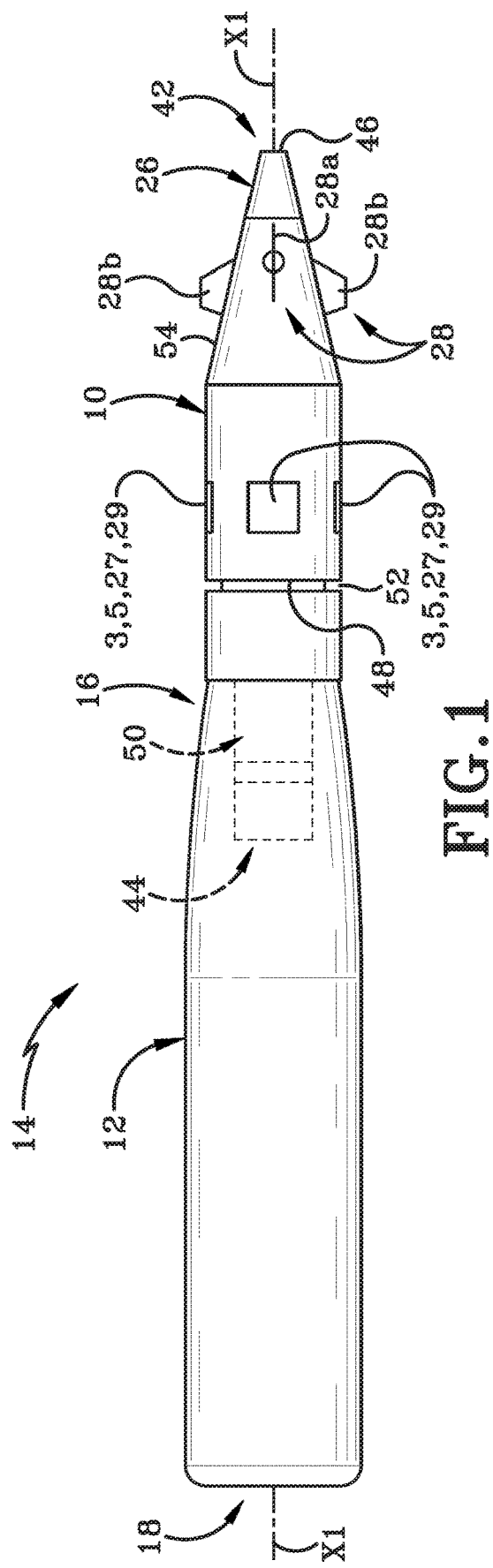
FIG. 1 is a schematic view of an interference nulling system carried by a guided projectile including a munition body and a precision guidance kit in accordance with one aspect of the present disclosure.

As depicted throughout FIG. 1 through FIG. 6, an interference nulling system in accordance with certain aspects of the present disclosure is shown generally at 1. The interference nulling system 1 includes an antenna array 3 having two or more antenna elements 5, at least one sensor 7, dynamic motion data logic 9, update logic 11, weight logic 13, first position logic 15, second position logic 17, first orientation logic 19, second orientation logic 21, adaptive weight logic 23, position and velocity logic 25a, and tracking logic 25b. The interference nulling system 1 is operably engaged with a moveable platform 10. The moveable platform 10 may be any suitable moveable platform. Some exemplary moveable platforms include, but are not limited to, unmanned aerial vehicles (UAVs), manned aerial vehicles, land-based vehicles, sea-based vehicles, projectiles, guided projectiles, artillery shells, missiles, rockets, or any other suitable moveable platforms. Although the interference nulling system 1 has been described as including particular logics, it is to be understood that the interference nulling system 1 may include any suitable logics.

In one particular embodiment, the moveable platform 10 may be a precision guidance kit (PGK), which is also shown generally at 10, operatively coupled with a munition body 12, which may also be referred to as a projectile, to create a guided projectile 14. The PGK 10 may be connected to the munition body 12 via a threaded connection; however, the PGK 10 may be connected to the munition body 12 in any suitable manner. Although the platform 10 is depicted as being the PGK 10 operatively coupled to the munition body 12 forming the guided projectile 14, it is to be understood that the platform 10 may be any moveable vehicle.

FIG. 1 depicts that the munition body 12 includes a front end 16 and an opposite tail or rear end 18 defining a longitudinal direction therebetween. The munition body 12 includes an annular edge 20 (FIG. 1A), which, in one particular embodiment, is a leading edge on the munition body 12 such that the annular edge 20 is a leading annular edge that is positioned at the front end 16 of the munition body 12. The munition body 12 may define a cylindrical cavity 22 extending rearward from the annular edge 20 longitudinally centrally along a center of the munition body 12. The munition body 12 is formed from material, such as metal, that is structurally sufficient to carry an explosive charge configured to detonate or explode at, or near, a target 24 (FIG. 3). The munition body 12 may include tail flights (not shown) which help stabilize the munition body 12 during flight.

Figure 1A:
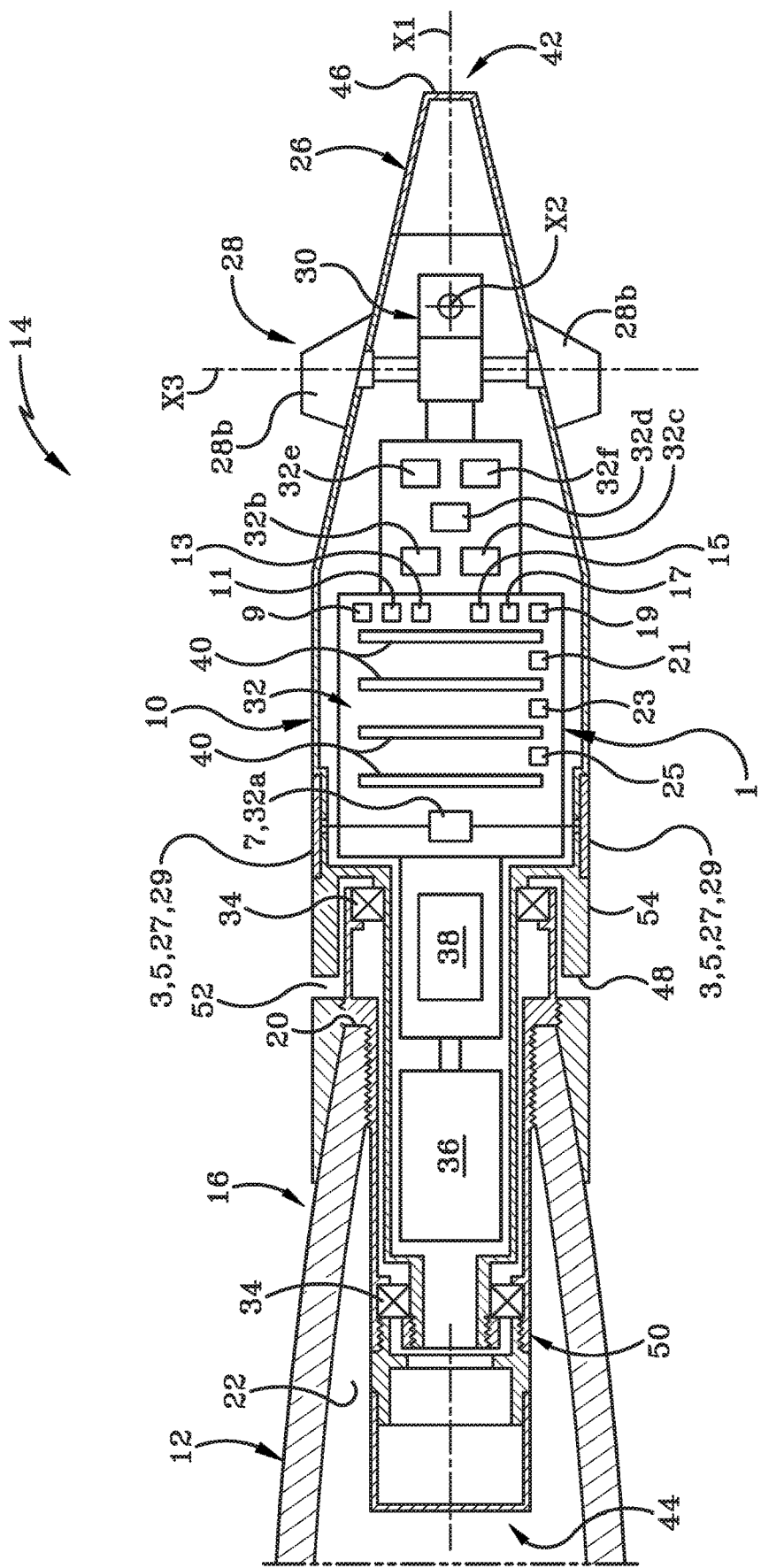
FIG. 1A is an enlarged fragmentary cross-section view of the interference nulling system carried by the guided projectile in accordance with one aspect of the present disclosure.
Figure 2:
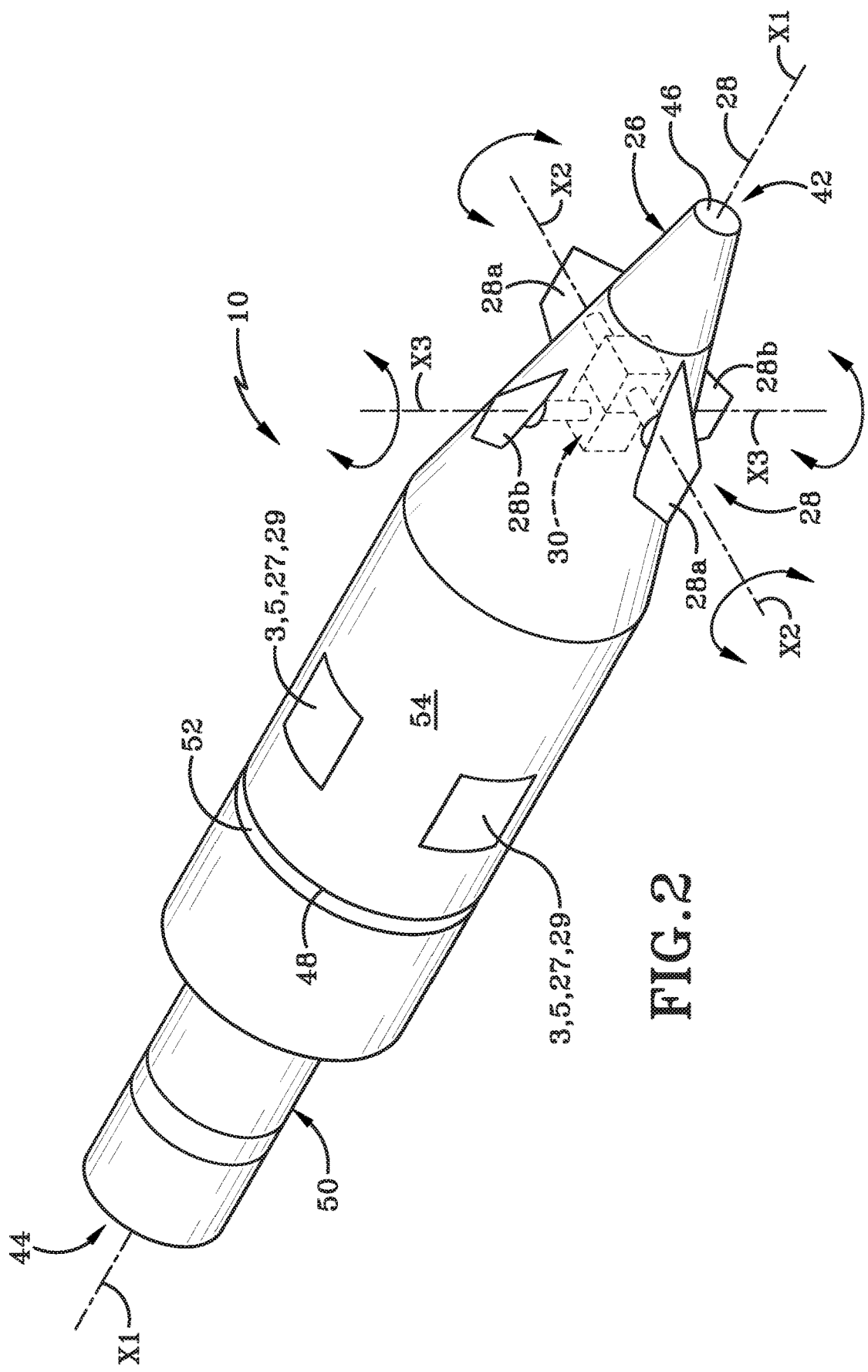
FIG. 2 is a schematic perspective view of the precision guidance kit.

FIG. 1 and FIG. 1A depict that the PGK 10, which may also be referred to as a despun assembly, includes, in one example, a fuze setter 26, a canard assembly 28 having one or more canards 28a, 28b, a control actuation system (CAS) 30, a guidance, navigation and control (GNC) section 32, at least one bearing 34, and a battery 36. In one particular embodiment, the interference nulling system 1 is provided within the GNC section 32 of the PGK 10. As such, the antenna array 3 having two or more antenna elements 5 and the at least one sensor 7 is carried within the GNC section of the PGK 10. Although the interference nulling system 1 has been described as being provided within the GNC section 32 of the PGK 10, the interference nulling system 1 may be provided in any suitable manner on the PGK 10. In one particular embodiment, the antenna array 3 is a GPS antenna array 27 having two or more GPS antenna elements 29. In one particular embodiment, the at least one sensor 7 is a plurality of sensors, such as, for example, a GPS receiver 32a, a magnetometer 32b, a microelectromechanical systems (MEMS) gyroscope 32c, an MEMS accelerometer 32d, at least one inertial measurement unit (IMU) 32e, and at least one inertial navigation system (INS) 32f. The GPS antenna array 27 having two or more GPS antenna elements 29 is operatively engaged with the GPS receiver 32a. Although the at least one sensor 7 has been described as being particular sensors, it should be noted that in other examples the at least one sensor 7 may include other sensors, including, but not limited to, laser guided sensors, electro-optical sensors, imaging sensors, or any other suitable sensors. The at least one sensor 7 is configured to sense dynamic motion data of the PGK 10. The dynamic motion data represents one or more rotational motions and/or one or more translational motions of the PGK 10. The rotational motions and/or the translational motions may be depicted utilizing any suitable coordinate systems.

The PGK 10 includes a nose or front end 42 and an opposite tail or rear end 44. When the PGK 10 is connected to the munition body 12, a longitudinal axis X1 extends centrally from the rear end 18 of the munition body to the front end 42 of the PGK 10. FIG. 1A depicts one embodiment of the PGK 10 as generally cone-shaped and defines the nose 42 of the PGK 10. The one or more canards 28a, 28b of the canard assembly 28 are controlled via the CAS 30. The PGK 10 further includes a forward tip 46 and an annular edge 48. In one embodiment, the annular edge 48 is a trailing annular edge 48 positioned rearward from the tip 46. The annular edge 48 is oriented centrally around the longitudinal axis X1. The annular edge 48 on the canard PGK 10 is positioned forwardly from the leading edge 20 on the munition body 12. The PGK assembly 10 further includes a central cylindrical extension 50 that extends rearward and is received within the cylindrical cavity 22 via a threaded connection.

Annular edge 48 is shaped and sized complementary to the leading edge 20. In one particular embodiment, a gap 52 is defined between the annular edge 48 and the leading edge 20. The gap 52 may be an annular gap surrounding the extension 50 that is void and free of any objects in the gap 52 so as to effectuate the free rotation of the PGK 10 relative to the munition body 12.

PGK 10 may include at least one lift canard 28*a* extending radially outward from an exterior surface 54 relative to the longitudinal axis X1. The at least one lift canard 28*a* is pivotably connected to a portion of the PGK 10 via the CAS 30 such that the lift canard 28*a* pivots relative to the exterior surface 54 of the PGK 10 about a pivot axis X2. In one particular embodiment, the pivot axis X2 of the lift canard 28*a* intersects the longitudinal axis X1. In one particular embodiment, a second lift canard 28*a* is located diametrically opposite the at least one lift canard 28*a*, which could also be referred to as a first lift canard 28*a*. The second lift canard 28*a* is structurally similar to the first lift canard 28*a* such that it pivots about the pivot axis X2. The PGK 10 can control the pivoting movement of each lift canard 28*a* via the CAS 30. The first and second lift canards 28*a* cooperate to control the lift of the guided projectile 14 while it is in motion after being fired from a launch assembly 56 (FIG. 3).

The PGK 10 may further include at least one roll canard 28*b* extending radially outward from the exterior surface 54 relative to the longitudinal axis X1. In one example, the at least one roll canard 28*b* is pivotably connected to a portion of the PGK 10 via the CAS 30 such that the roll canard 28*b* pivots relative to the exterior surface 54 of the PGK 10 about a pivot axis X3. In one particular embodiment, the pivot axis X3 of the roll canard 28*b* intersects the longitudinal axis X1. In one particular embodiment, a second roll canard 28*b* is located diametrically opposite the at least one roll canard 28*b*, which could also be referred to as a first roll canard 28*b*. The second roll canard 28*b* is structurally similar to the first roll canard 28*b* such that it pivots about the pivot axis X3. The PGK 10 can control the pivoting movement of each roll canard 28*b* via the CAS 30. The first and second roll canards 28*b* cooperate to control the roll of the guided projectile 14 while it is in motion after being fired from the launch assembly 56 (FIG. 3).

Figure 3B:
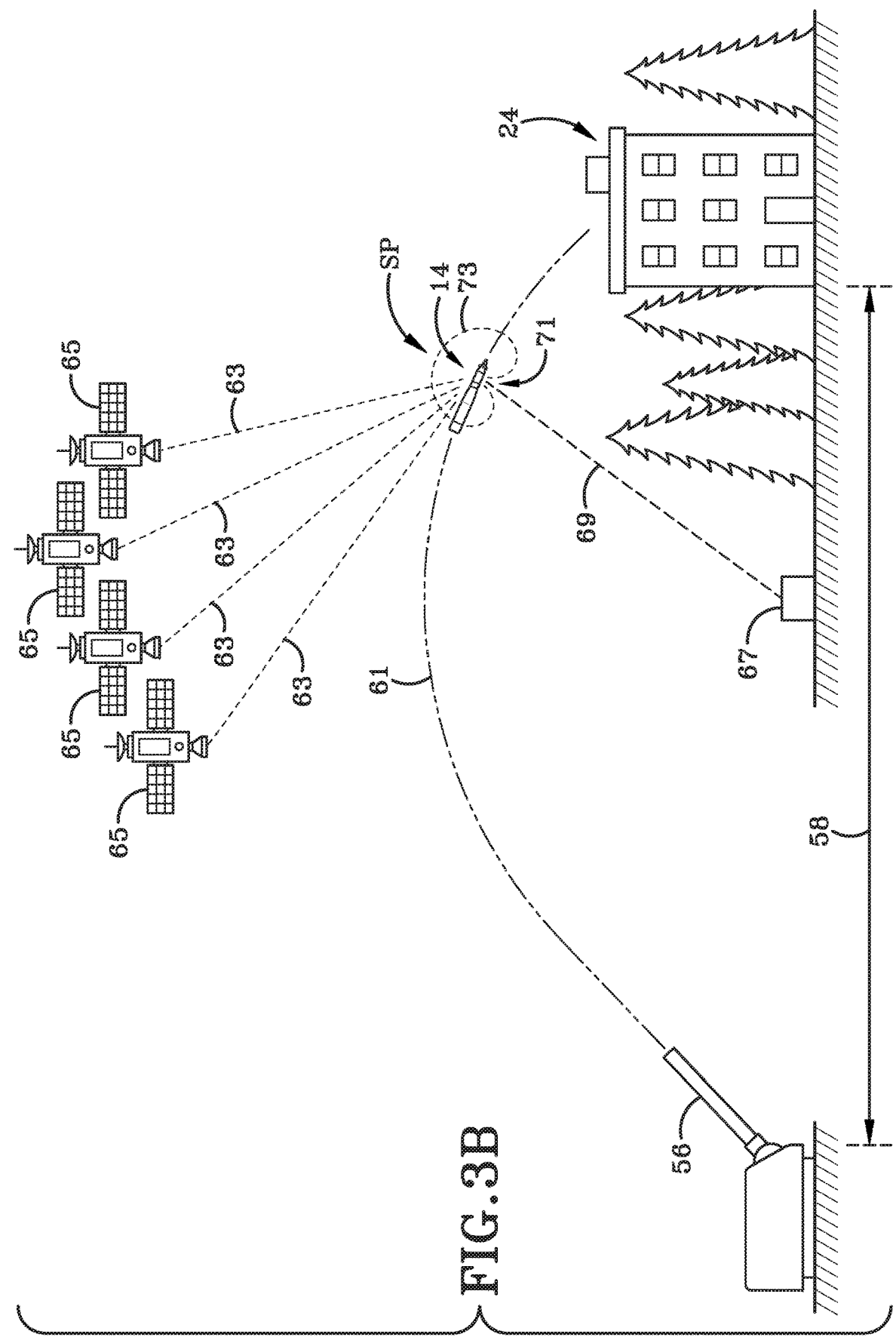
FIG. 3B is an operational schematic view of the interference nulling system carried by the guided projectile.

With primary reference to FIG. 3A and FIG. 3B, the operation of the interference nulling system 1 carried by the guided projectile 14 formed by the PGK 10 when it is connected to the munition body 12 is shown. As shown in FIG. 3A, the guided projectile 14 is fired from the launch assembly 56 elevated at a quadrant elevation towards the target 24 located at an estimated or nominal distance 58 from the launch assembly 56. As the guided projectile 14 travels along a trajectory 61, the guided projectile 14 receives GPS signals 63 from a plurality of GPS satellites 65. As shown in FIG. 3A, at least one interfering signal source 67, such as a GPS jammer, transmits interfering signals 69 in an attempt to deny the GPS antenna array 27 access to the GPS signals 63 while the guided projectile 14 is at a first position FP. Although the interfering signal source 67 has been described as being a GPS jammer, the interfering signal source 67 may be any interfering signal source. For example, and not meant as a limitation, the interfering signal source 67 may be any radio frequency (RF) jamming device capable of jamming any RF frequency, such as, for example, an RF jamming device used to jam communications in a communications system. In another non-limiting example, the interfering signal source 67 may be associated with multipath interference from reflections of the signal.

Figure 4A:
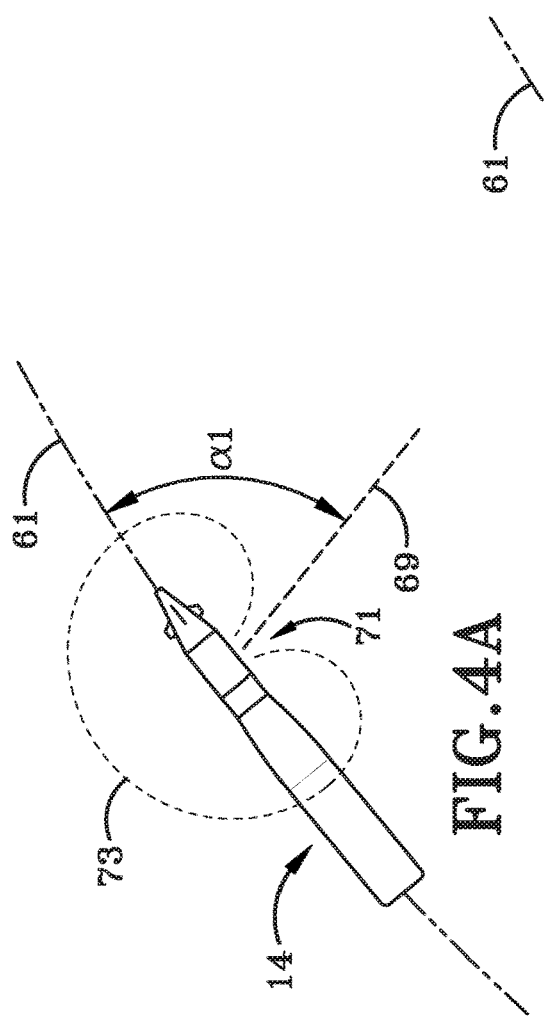
FIG. 4A is an operational schematic view of the interference nulling system carried by the guided projectile where the guided projectile is at a particular orientation and position and at least one steerable null is directed toward interfering signals at a first angle.
Figure 4B:
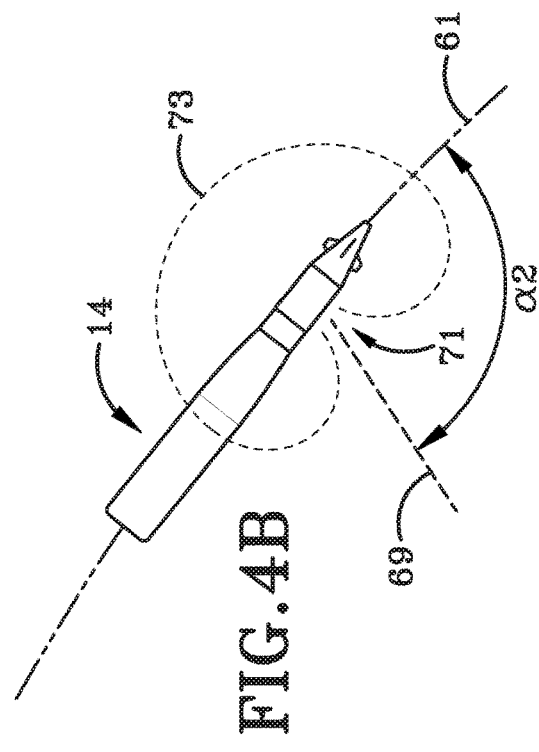
FIG. 4B is an operational schematic view of the interference nulling system carried by the guided projectile where the guided projectile is at a particular orientation and position and at least one steerable null is directed toward interfering signals at a second angle.
Figure 5:
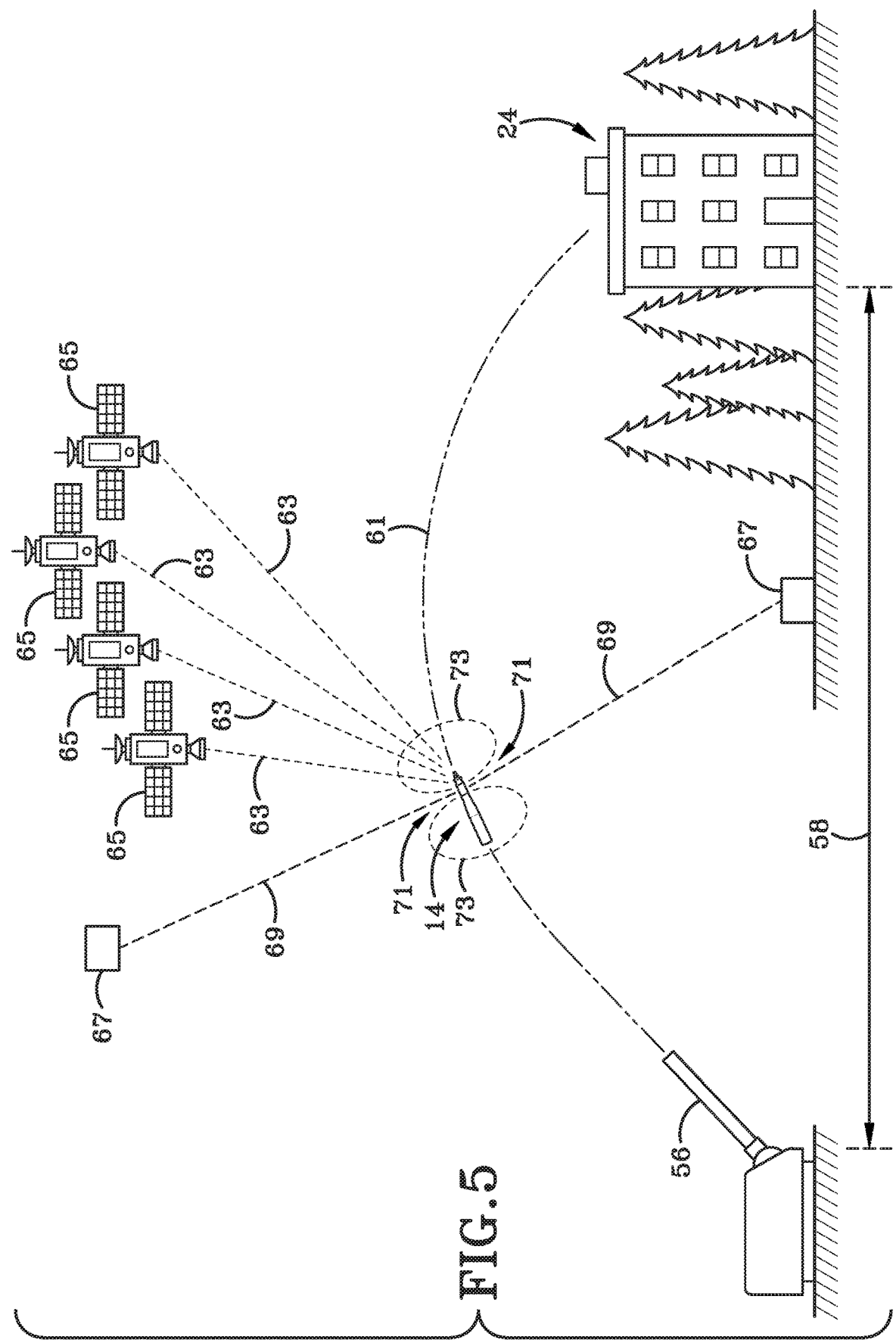
FIG. 5 is an operational schematic view of the interference nulling system carried by the guided projectile showing two interfering signal sources.

The GPS antenna array 27 including the two or more GPS antenna elements 29 generates at least one steerable null radiation pattern 71. In one example, the at least one steerable null radiation pattern 71 is generated by using the two or more GPS antennas 29 to shape a response pattern by determining a first set of weight coefficients of the two or more antenna elements 29. In one example, the weight coefficients are complex numbers or complex weights defined by an amplitude A and phase Phi which may be written as A*exp(i*phi) where "i" is sqrt(−1). In other words, the response pattern is shaped by selection of the weight coefficients of the two or more antenna elements 29. In one example, the weight logic 13, which may include at least one non-transitory computer readable storage medium having instructions encoded thereon that, when executed by at least one processor, implements operations to determine the first set of weight coefficients of the two or more antenna elements 29. The at least one steerable null radiation pattern 71 is based, at least in part, on the first set of weight coefficients determined by the weight logic 13. Typically, the output from each of the two or more antenna elements 29 is down converted to a baseband signal, which includes complex time samples. The complex time samples are multiplied by the first set of weight coefficients to form the signal processed by the GPS receiver 32*a*. Although a particular manner of generating the at least one steerable null radiation pattern 71 has been described, the at least one steerable null radiation pattern 71 may be generated in any suitable manner. The at least one steerable null radiation pattern 71 is directed towards the interfering signals 69 which nulls out the interfering signals 69. The GPS antenna array 27 including the two or more GPS antenna elements 29 generates at least one steerable main lobe radiation pattern 73 which is directed towards the GPS signals 63, which are the signals of interest, so only the GPS signals 63 are received by the GPS receiver 32*a*. However, since the PGK 10 rotates and translates, the direction and/or angle of the at least one steerable null radiation pattern 71 changes based upon the changes in the rotation and translation of the PGK 10. Since the PGK 10 is a seven degree of freedom (DOF) system, the PGK 10 can rotate relative to the munition body 12 and the motion of the munition body 12 can be accounted for. An exemplary change in the direction and/or angle of the at least one steerable null radiation pattern 71 is shown in FIG. 3B where the guided projectile is at a second position SP that is different than the first position FP. In the event there are two or more interfering signal sources 67, with FIG. 5 showing one exemplary scenario, the teachings of the present disclosure can be applied to null or suppress the interfering signals 69 being transmitted from the two or more interfering signal sources 67. Another exemplary change in the direction and/or angle of the at least one steerable null radiation pattern 71 is shown in FIG. 4A and FIG. 4B. As shown in FIG. 4A, the guided projectile 14 is at a particular orientation and position and the at least one steerable null 71 is directed toward the interfering signals 69 at a first angle $\alpha_1$, and as shown in FIG. 4B, the guided projectile 14 is at a different orientation and a different position and the at least one steerable null 71 is directed toward the interfering signals 69 at a second angle $\alpha_2$. One conventional method that accounts for the changes in the direction of the at least one steerable null radiation pattern 71 readjusts the first set of weight coefficients in response to the received level of interfering signals 69 coming from the interfering signal source 67. Since the readjustments are based on a response to the received interfering signals 69 coming from the interfering signal source 67, the conventional method may be subject to delays and may have difficulty nulling out the interfering signals 69 due to the rapidly changing dynamics of the PGK 10. Further, if the interfering signal source 67 ceases transmission of the interfering signals 69, the interfering signal source 67 cannot typically be tracked. When the interfering signal source 67 activates transmission of the interfering signals 69, the at least one steerable null 71 typically will not be pointing in the direction of the interfering signals 69 due to the change in the geometry related to the dynamics of the PGK 10 which typically causes a time delay before the at least one steerable null radiation pattern 71 is pointed toward the interfering signals 69. Therefore, there is a need for, and the present disclosure provides, an updated mechanism that accounts for rotations and/or translations of the PGK 10, such as, for example, changes in roll, pitch or yaw and/or translations as the PGK 10 travels along the trajectory 61 as more fully described below.

The dynamic motion data logic 9 may include at least one non-transitory computer readable storage medium having instructions encoded thereon that, when executed by at least one processor, implements operations to determine dynamic motion data of the PGK 10. The dynamic motion data may represent one or more rotational and/or translational motions of the PGK 10. For example, and not meant as a limitation, the dynamic motion data logic 9 may determine, inter alia, the position, orientation, and velocity of the PGK 10 based, at least in part, on the measurements from the at least one sensor 7. In one non-limiting example, position data of the PGK 10 may be provided by the GPS antenna elements 29 and the GPS receiver 32*a* and the orientation and velocity data of the PGK 10 may be provided by one or more of the magnetometer 32*b*, the MEMS gyroscope 32*c*, the MEMS accelerometer 32*d*, the at least one IMU 32*e*, and the at least one INS 32*f*. Although a particular manner of determining the position, orientation, and velocity of the PGK 10 has been described, the position, orientation, and velocity of the PGK 10 may be determined in any suitable manner.

In one particular embodiment, the update mechanism may be update logic 11 which may include at least one non-transitory computer readable storage medium having instructions encoded thereon that, when executed by at least one processor, implements operations to update the at least one steerable null radiation pattern 71 based, at least in part, on the dynamic motion data as more fully described below. The at least one updated steerable null radiation pattern 71 is directed toward a direction from which the interfering signals 69 are being transmitted from the interfering signal source 67.

The first position logic 15, which may include at least one non-transitory computer readable storage medium having instructions encoded thereon that, when executed by at least one processor, implements operations to determine a current position of the PGK 10 based, at least in part, on the dynamic motion data. The second position logic 17, which may include at least one non-transitory computer readable storage medium having instructions encoded thereon that, when executed by at least one processor, implements operations to determine a predicted position of the PGK 10 based, at least in part, on the dynamic motion data. The predicted position of the PGK 10 may be determined by utilizing a projectile dynamics model, such as a seven DOF model; however, any suitable projectile dynamics model may be utilized. For example, and not meant as a limitation, the projectile dynamics model may be a three DOF model including, at least in part, a Jacobian reference, a three DOF model including, at least in part, a drag profile, a three DOF model including, at least in part, a steering Jacobian reference accounting for, at least in part, steering applied to the guided projectile 14, a five DOF model, a six DOF model, and a seven DOF model. The various DOF models, such as the augmented three DOF model, the five DOF model, the six DOF model, and the seven DOF model may vary in accuracy and complexity and the type of DOF model utilized with the teachings of the present disclosure may depend on particular applications and configurations. The adaptive weight logic 23, which may include at least one non-transitory computer readable storage medium having instructions encoded thereon that, when executed by at least one processor, implements operations to determine a second set of weight coefficients of the two or more antenna elements 29 based, at least in part, on the current position of the PGK 10 and the predicted position of the PGK 10. In this example, the at least one updated steerable null radiation pattern 71 is based, at least in part, on the second set of weight coefficients.

The first orientation logic 19, which may include at least one non-transitory computer readable storage medium having instructions encoded thereon that, when executed by at least one processor, implements operations to determine a current orientation of the PGK 10 based, at least in part, on the dynamic motion data. The second orientation logic 21, which may include at least one non-transitory computer readable storage medium having instructions encoded thereon that, when executed by at least one processor, implements operations to determine a predicted orientation of the PGK 10 based, at least in part, on the dynamic motion data. The predicted orientation of the PGK 10 may be determined by utilizing a projectile dynamics model, such as a seven degree of freedom (DOF) model; however, any suitable projectile dynamics model may be utilized. For example, and not meant as a limitation, the projectile dynamics model may be a three DOF model including, at least in part, a Jacobian reference, a three DOF model including, at least in part, a drag profile, a three DOF model including, at least in part, a steering Jacobian reference accounting for, at least in part, steering applied to the guided projectile 14, a five DOF model, a six DOF model, and a seven DOF model. The various DOF models, such as the augmented three DOF model, the five DOF model, the six DOF model, and the seven DOF model may vary in accuracy and complexity and the type of DOF model utilized with the teachings of the present disclosure may depend on particular applications and configurations. The adaptive weight logic 23 may determine a second set of weight coefficients of the two or more antenna elements 29 based, at least in part, on the current orientation of the PGK 10 and the predicted orientation of the PGK 10. In this example, the at least one updated steerable null radiation pattern 71 is based, at least in part, on the second set of weight coefficients.

The position and velocity logic 25*a*, which may include at least one non-transitory computer readable storage medium having instructions encoded thereon that, when executed by at least one processor, implements operations to determine a location of the interfering signal source 67. In one example, the location of the interfering signal source 67 is predetermined and uploaded to the interference nulling system 1 prior to generating the at least one steerable null radiation pattern 71. In another example, determining the location of the interfering signal source 67 is accomplished by triangulation.

The tracking logic 25*b*, which may include at least one non-transitory computer readable storage medium having instructions encoded thereon that, when executed by at least one processor, implements operations to track movement (e.g. a position and velocity) of the at least one interfering signal source 67. In one example, the tracking logic 25*b* utilizes the position and velocity of the at least one interfering signal source 67 determined by the position and velocity logic 25*a* to determine a predicted position and velocity of the at least one interfering signal source 67. The adaptive weight logic 23 may determine a second set of weight coefficients of the two or more antenna elements 29 based, at least in part, on the predicted position and velocity of the at least one interfering signal source 67. In this example, the at least one updated steerable null radiation pattern 71 is based, at least in part, on the second set of weight coefficients.

Figure 6:
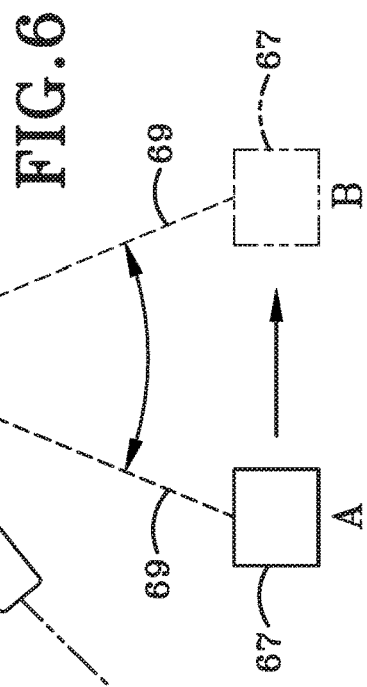
FIG. 6 is an operational schematic view of the interference nulling system carried by the guided projectile where the guided projectile is at a particular orientation and position and at least one steerable null is directed toward a moving interfering signal source.

For example, and not meant as a limitation, the at least one interfering signal source 67 may move from one position to another position as shown in FIG. 6 as position A and position B. The position and velocity logic 25a determines the location of the interfering signal source at location A and the tracking logic 25b determines a predicted position of the at least one interfering source 67 at position B. After the tracking logic 25b determines the predicted position B of the at least one interfering signal source 67, the at least one steerable null radiation pattern 71 is directed toward position B.

The above-described processes associated with the interference nulling system 1 may be iterated until the end of the guided projectile's 14 flight path or any other desired time period. For example, the interference nulling system 1 may continuously receive dynamic motion data over a specified period time, such as every second of the guided projectile's flight path, continuously update the at least one steerable null radiation pattern 71, and continuously direct the at least one steerable null radiation pattern 71 toward a direction from which the interfering signals 69 are being transmitted from the interfering signal source 67. As described above, the at least one updated steerable null radiation patterns 71 are generated based, at least in part, on the dynamic motion data of the PGK 10. Some benefits of the interference nulling system 1 of the present disclosure include, inter alia, allowing the at least one steerable null radiation pattern 71 to be accurately directed toward interfering signals 69 in highly dynamic conditions, improving update latency by utilizing dynamic motion data to update the weight coefficients of the antenna elements 29, allowing tracking of interfering signal sources 67, and removing the need to relock nulls on an interfering signal source 67 after an interfering signal source 67 ceases and activates transmission of interfering signals 69.

Figure 7:
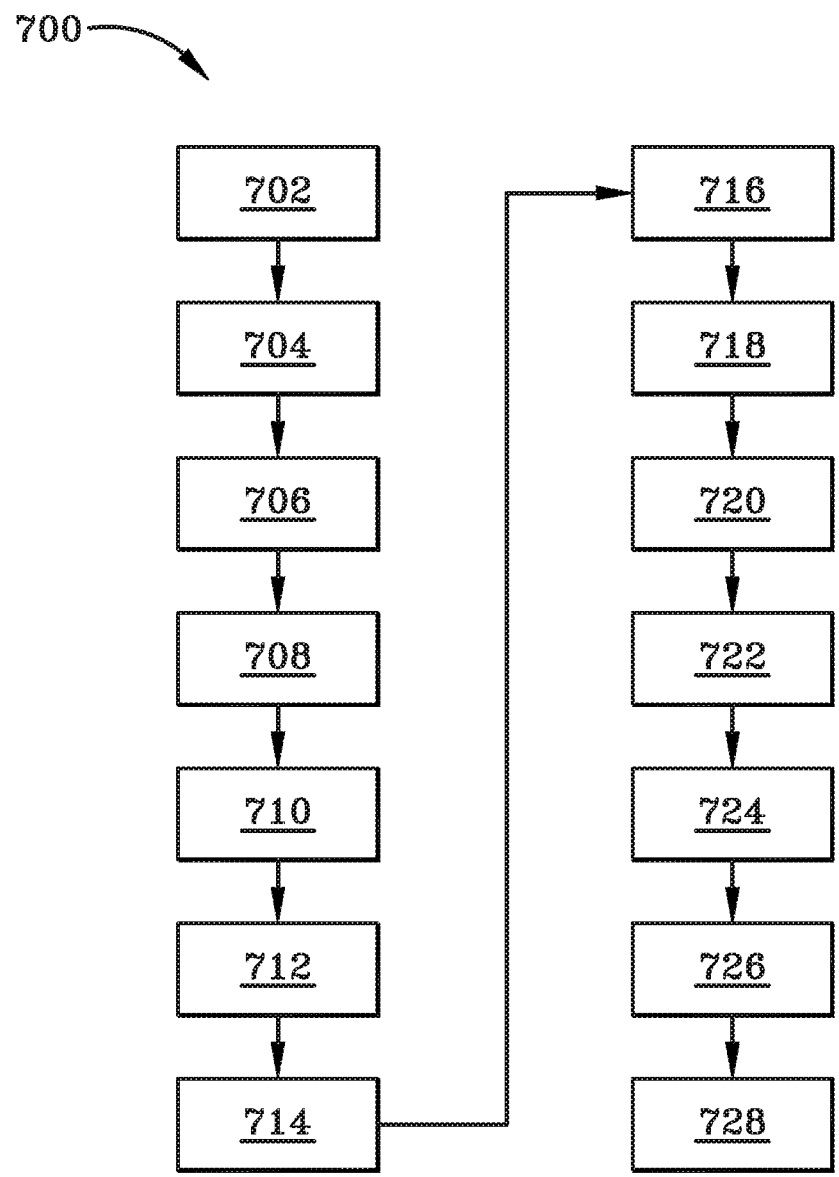
FIG. 7 is a flow chart of one method or process of the present disclosure.

FIG. 7 is a flow chart of one method or process in accordance with the present disclosure and is generally indicated at 700. The method 700 may include generating at least one initial steerable null radiation pattern 71 of an array antenna 3 including two or more antenna elements 5 carried by a moveable platform 10, which is shown generally at 702. The method 700 may include obtaining dynamic motion data of the moveable platform 10, which is shown generally at 704. The method 700 may include updating the at least one initial steerable null radiation pattern 71 based, at least in part, on the dynamic motion data of the moveable platform 10, which is shown generally at 706. The method 700 may include directing the at least one updated steerable null radiation pattern 71 toward a direction from which interfering signals 69 are being transmitted from at least one interfering signal source 67, which is shown generally at 708. In one example, obtaining dynamic motion data of the moveable platform 10 may be accomplished by sensing the dynamic motion data with at least one sensor 7 carried by the moveable platform 10. In one example, the dynamic motion data represents one or more rotational motions or one or more translational motions of the moveable platform 10.

The method 700 may further include determining a first set of weight coefficients of the two or more antenna elements 5, which is shown generally at 710. The at least one steerable null radiation pattern 71 may be based, at least in part, on the first set of weight coefficients.

The method 700 may include determining a current position of the moveable platform 10 based, at least in part, on the dynamic motion data, which is shown generally at 712. The method 700 may include determining a predicted position of the moveable platform 10 based, at least in part, on the dynamic motion data, which is shown generally at 714. The method 700 may include determining a second set of weight coefficients of the two or more antenna elements 5 based, at least in part, on the current position of the moveable platform 10 and the predicted position of the moveable platform 10, which is shown generally at 716. The at least one updated steerable null radiation pattern 71 may be based, at least in part, on the second set of weight coefficients.

The method 700 may include determining a current orientation of the moveable platform 10 based, at least in part, on the dynamic motion data, which is shown generally at 718. The method 700 may include determining a predicted orientation of the moveable platform 10 based, at least in part, on the dynamic motion data, which is shown generally at 720. The method 700 may include determining a second set of weight coefficients of the two or more antenna elements based, at least in part, on the current position of the moveable platform 10 and the predicted position of the moveable platform 10, which is shown generally at 722. The at least one updated steerable null radiation pattern 71 may be based, at least in part, on the second set of weight coefficients. The method 700 may include determining a location of the interfering signal source 67, which is shown generally at 724.

In one example the moveable platform 10 may be a precision guidance kit 10 for a guided projectile 14; wherein the interference nulling system 1 is carried by the precision guidance kit 10; and wherein the precision guidance kit 10 comprises a canard assembly 28 including at least one canard 28a, 28b that is moveable. The method 700 may further include rotating the precision guidance kit 10 in one or more rotational motions; wherein the dynamic motion data represents the one or more rotational motions, which is shown generally at 726. The method 700 may further include translating the precision guidance kit 10 in one or more translational motions; wherein the dynamic motion data represents the one or more translational motions, which is shown generally at 728.

Figure 8:
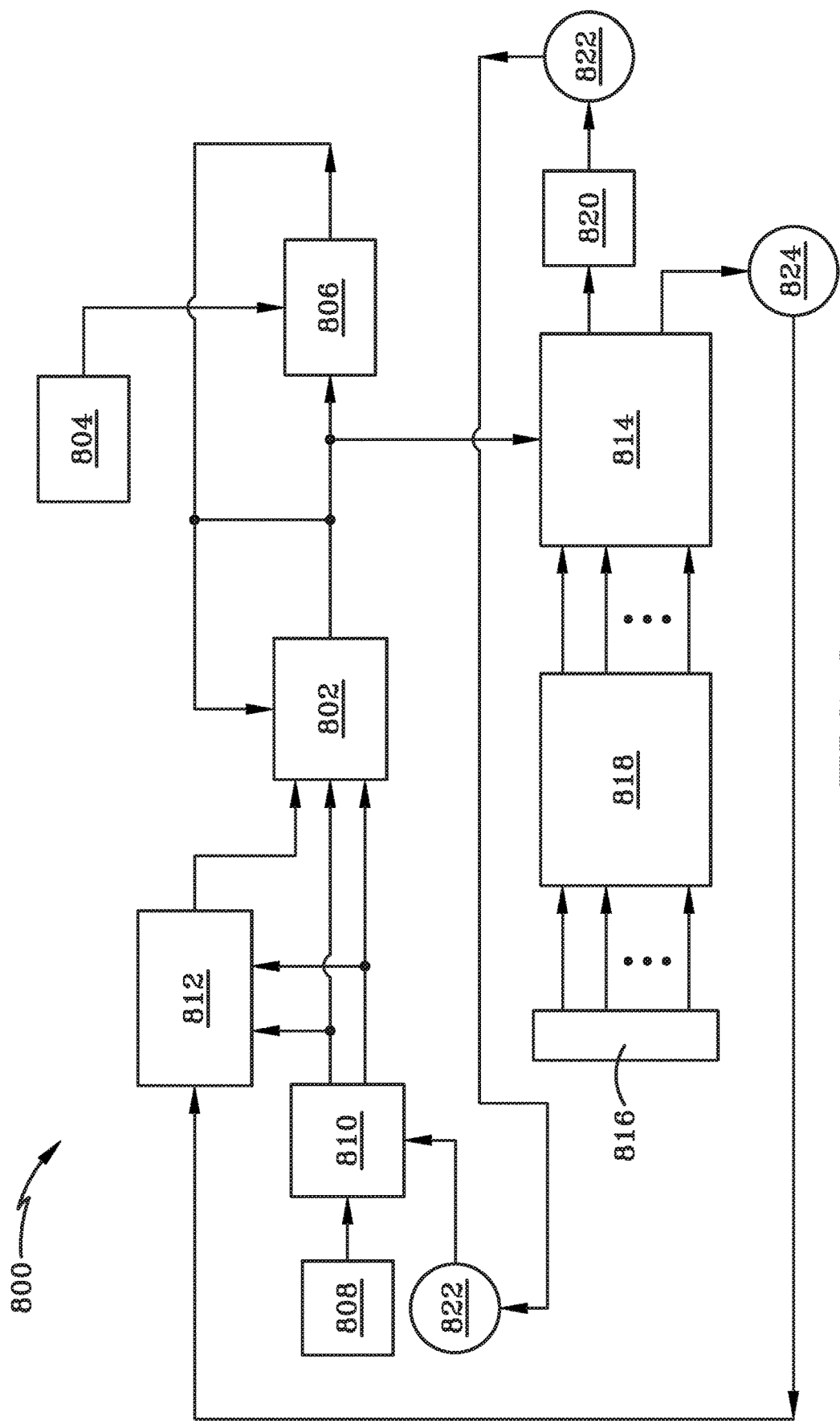
FIG. 8 is a schematic block diagram of one method or process in accordance with the present disclosure.

FIG. 8 is a schematic block diagram of one method or process in accordance with the present disclosure generally indicated at 800. The method 800 may include computing a change in the weight coefficients of the two or more antenna elements 5, which may be referred to as Δw, and in one particular embodiment, is represented by the difference between the current, or first, set of weight coefficients of the two or more antenna elements 5, and the updated, or second, set of weight coefficients of the two or more antenna elements 5. The computation of Δw occurs at block 802. The initial or first set of weight coefficients of the two or more antenna elements 5 are computed at block 804 and are fed to block 806, which may also be referred to as a sample and hold block. The first set of weight coefficients are needed to steer the at least one steerable null radiation pattern 71 towards a direction from which interfering signals 69 are being transmitted from the at least one interfering signal source 67. The first set of weight coefficients is stored in block 806. The first set of weight coefficients, and later the current set of weights, of the two or more antenna elements 5 is provided to block 802. In order to compute Δw, block 802 may be fed data from block 808, which may contain data from the at least one sensor 7, such as the IMU 32e, from block 810, which may contain data from the at least one sensor 7, such as the INS 32f, as well as GPS data as more fully described below. Estimated positions x(t), orientation angles φ(t), θ(t), ψ(t), angular rate of change of positions p(t), q(t), and r(t), and velocities v(t) of the PGK 10 are computed based on the data received from block 808, 810, and the GPS data, and future predictions of x(t+Δt), orientation angles φ(t+Δt), θ(t+Δt), ψ(t+Δt), angular rate of change of positions p(t+Δt), q(t+Δt), and r(t+Δt), and velocities v(t+Δt) of the PGK 10, are computed based on the data received from block 808, 810, and the GPS data. The estimated positions, orientation angles, angular rate of change of positions, and velocities of the PGK 10 and the predicted positions, orientation angles, angular rate of change of positions, and velocities are fed to block 802 to compute the Δw. Optionally, block 802 may be fed data from block 812, which may contain predicted positions and velocities of the at least one interfering signal source 67 and the data from block 812 may be utilized to compute Δw via a Kalman filter or any other suitable tracking process or method. Thus, Δw is computed based on the current, or first, set of weight coefficients of the two or more antenna elements 5 and the geometrical factors supplied from boxes 808, 810, and 812. The current, or first, set of weight coefficients of the two or more antenna elements 5 are added to the Δw to compute the updated, or second, set of weight coefficients of the two or more antenna elements 5, which may be referred to as w(t+Δt). The updated, or second set of weight coefficients of the two or more antenna elements 5 are fed to block 814, which may also be referred to as a weighting and null angle estimator block, and back to block 806, which is updated at every iteration of the method 800. Therefore, the method 800 provides an updated, or second, set of weight coefficients of the two or more antenna elements 5 every iteration or cycle of the method 800. Block 816, which contains data received by the two or more antenna elements 5, or the raw GPS signals received by the two or more antenna elements 5, feeds data to block 818, which produces data from an I and Q downconversion process, and the downconverted data is fed to block 814. The weighting process associated with block 814 multiplies the updated, or current or second, set of weight coefficients of the two or more antenna elements 5, or w(t+Δt), with the downconverted signals for each antenna element 5 of the two or more antenna elements 5 to provide a weighted signal R, which has interference suppressed or removed, which is fed to block 820 to be processed by the GPS receiver 32a. The GPS receiver 32a produces GPS data which is fed to block 822. The GPS data used to compute the estimated positions and velocities of the PGK 10 and the future predictions of positions and velocities of the PGK 10 as described above is provided by block 822. Further, the GPS data includes an estimate of the position and velocity of the PGK 10 which is used to steer the PGK 10. Block 814 produces a null location which is fed to block 824. The null location is fed to block 812 and block 812 uses the null location to track the interfering signal source 67 and estimate velocities of the interfering signal source 67. The steerable null radiation patterns 71 are utilized to remove or suppress the effect of the interfering signals 69 from the interfering signal source 67 in the weighted signal R.

It is to be understood that the various logics, such as the dynamic motion data logic 9, the update logic 11, the weight logic 13, the first position logic 15, the second position logic 17, the first orientation logic 19, the second orientation logic 21, the adaptive weight logic 23, the position and velocity logic 25a, and the tracking logic 25b may utilize any suitable number of non-transitory computer readable storage mediums and any suitable number of processors. For example, and not meant as a limitation, the various logics can be stored on one non-transitory computer readable storage medium or multiple computer readable storage mediums and the various logics can be processed by any suitable number of processors.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Guided projectile" or guided projectile 14 refers to any launched projectile such as rockets, mortars, missiles, cannon shells, shells, bullets and the like that are configured to have in-flight guidance.

"Launch Assembly" or launch assembly 56, as used herein, refers to rifle or rifled barrels, machine gun barrels, shotgun barrels, howitzer barrels, cannon barrels, naval gun barrels, mortar tubes, rocket launcher tubes, grenade launcher tubes, pistol barrels, revolver barrels, chokes for any of the aforementioned barrels, and tubes for similar weapons systems, or any other launching device that imparts a spin to a munition round or other round launched therefrom.

In some embodiments, the munition body 12 is a rocket that employs a precision guidance kit 10 that is coupled to the rocket and thus becomes a guided projectile 14.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An interference nulling system for a moveable platform, comprising:
    an antenna array including two or more antenna elements that generates at least one initial steerable null radiation pattern; wherein the at least one initial steerable null radiation pattern is directed toward a direction from which interfering signals are being transmitted from at least one interfering signal source;
    at least one sensor that senses dynamic motion data of the moveable platform; wherein the dynamic motion data includes at least one or more rotational movements of the moveable platform;
    dynamic motion data logic that processes the dynamic motion data of the moveable platform;
    update logic that updates the at least one initial steerable null radiation pattern to generate an at least one updated steerable null radiation pattern based, at least in part, on the dynamic motion data; wherein the at least one updated steerable null radiation pattern is directed toward the direction from which the interfering signals are being transmitted from the at least one interfering signal source;
    weight logic that determines a first set of weight coefficients of the two or more antenna elements; wherein the at least one initial steerable null radiation pattern is based, at least in part, on the first set of weight coefficients;
    first position logic that determines a current position of the moveable platform based, at least in part, on the dynamic motion data;
    second position logic that determines a predicted position of the moveable platform based, at least in part, on the dynamic motion data; and
    adaptive weight logic that determines a second set of weight coefficients of the two or more antenna elements based, at least in part, on a change between the current position of the moveable platform and the predicted position of the moveable platform; wherein the at least one updated steerable null radiation pattern is based, at least in part, on the second set of weight coefficients.

2. The interference nulling system of claim 1, further comprising:
   an initial set of weight coefficients of the two or more antenna elements; wherein the at least one initial steerable null radiation pattern is based, at least in part, on the initial set of weight coefficients of the two or more antenna elements; and
   an updated set of weight coefficients of the two or more antenna elements; wherein the at least one updated steerable null radiation pattern is based, at least in part, on the updated set of weight coefficients of the two or more antenna elements.

3. The interference nulling system of claim 1, wherein no interfering signals are received by the interference nulling system after the at least one initial steerable null radiation pattern is directed toward the direction from which interfering signals are being transmitted from the at least one interfering signal source.

4. The interference nulling system of claim 1, further comprising:
   first orientation logic that determines a current orientation of the moveable platform based, at least in part, on the dynamic motion data;
   second orientation logic that determines a predicted orientation of the moveable platform based, at least in part, on the dynamic motion data; and
   adaptive weight logic that determines the second set of weight coefficients of the two or more antenna elements based, at least in part, on a change between the current orientation of the moveable platform and the predicted orientation of the moveable platform; wherein the at least one updated steerable null radiation pattern is based, at least in part, on the second set of weight coefficients.

5. The interference nulling system of claim 1, further comprising:
   position and velocity logic that determines a position and velocity of the interfering signal source;
   tracking logic that tracks movement of the at least one interfering signal source; and
   adaptive weight logic that determines the second set of weight coefficients of the two or more antenna elements based, at least in part, on the movement of the at least one interfering signal source; wherein the at least one updated steerable null radiation pattern is based, at least in part, on the second set of weight coefficients.

6. The interference nulling system of claim 1, wherein the moveable platform is a precision guidance kit for a guided projectile; wherein the interference nulling system is carried by the precision guidance kit; and wherein the precision guidance kit comprises a canard assembly including at least one canard that is moveable.

7. The interference nulling system of claim 6, wherein the dynamic motion data represents one or more rotational motions of the interference nulling system.

8. The interference nulling system of claim 7, wherein the dynamic motion data represents one or more translational motions of the interference nulling system.

9. A method comprising:
   generating at least one initial steerable null radiation pattern of an array antenna including two or more antenna elements carried by a moveable platform;
   obtaining dynamic motion data of the moveable platform having moved from a first position to a second position; wherein the dynamic motion data includes at least one or more rotational movements of the moveable platform;
   updating the at least one initial steerable null radiation pattern based, at least in part, on the dynamic motion data of the moveable platform; and
   directing the at least one updated steerable null radiation pattern toward a direction from which interfering signals are being transmitted from an interfering signal source;
   determining a first set of weight coefficients of the two or more antenna elements; wherein the at least one initial steerable null radiation pattern is based, at least in part, on the first set of weight coefficients;
   determining a current position of the moveable platform based, at least in part, on the dynamic motion data;
   determining a predicted position of the moveable platform based, at least in part, on the dynamic motion data; and
   determining a second set of weight coefficients of the two or more antenna elements based, at least in part, on the current position of the moveable platform and the predicted position of the moveable platform; wherein the at least one updated steerable null radiation pattern is based, at least in part, on the second set of weight coefficients.

10. The method of claim 9, wherein the at least one initial steerable null radiation pattern is based, at least in part, on an initial set of weight coefficients of the two or more antenna elements; and wherein the at least one updated steerable null radiation pattern is based, at least in part, on an updated set of weight coefficients of the two or more antenna elements.

11. The method of claim 9, wherein the dynamic motion data represents one of: (i) one or more rotational motions of the moveable platform; and (ii) one or more translational motions of the moveable platform.

12. The method of claim 9, further comprising:
   determining a current orientation of the moveable platform based, at least in part, on the dynamic motion data;
   determining a predicted orientation of the moveable platform based, at least in part, on the dynamic motion data; and
   determining the second set of weight coefficients of the two or more antenna elements based, at least in part, on the current position of the moveable platform and the predicted position of the moveable platform; wherein the at least one updated steerable null radiation pattern is based, at least in part, on the second set of weight coefficients.

13. The method of claim 9, further comprising:
   determining a position and velocity of the interfering signal source;
   tracking the movement of the at least one interfering signal source; and
   determining the second set of weight coefficients of the two or more antenna elements based, at least in part, on the movement of the at least one interfering signal source; wherein the at least one updated steerable null radiation pattern is based, at least in part, on the second set of weight coefficients.

14. The method of claim 9, wherein the moveable platform is a precision guidance kit for a guided projectile; wherein the interference nulling system is carried by the precision guidance kit; and wherein the precision guidance kit comprises a canard assembly including at least one canard that is moveable.

15. The method of claim 14, further comprising:
rotating the precision guidance kit in one or more rotational motions; wherein the dynamic motion data represents the one or more rotational motions.

16. The method of claim 14, further comprising:
translating the precision guidance kit in one or more translational motions; wherein the dynamic motion data represents the one or more translational motions.

\* \* \* \* \*